United States Patent
Feugere (10) Patent No.: US 7,920,695 B2
(45) Date of Patent: Apr. 5, 2011

(54) TELEPHONY DISTRIBUTION SYSTEM

(75) Inventor: Pierre Feugere, Limoges (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 1503 days.

(21) Appl. No.: 11/183,817

(22) Filed: Jul. 19, 2005

(65) Prior Publication Data

US 2006/0029210 A1    Feb. 9, 2006

(30) Foreign Application Priority Data

Jul. 19, 2004   (FR) ..................................... 04 07973

(51) Int. Cl.
*H04M 1/00* (2006.01)
(52) U.S. Cl. ........................ 379/377; 379/383
(58) Field of Classification Search .................. 379/383, 379/87, 334, 378, 397, 377, 379
See application file for complete search history.

(56) References Cited

U.S. PATENT DOCUMENTS

| | | | | |
|---|---|---|---|---|
| 4,551,671 A | * | 11/1985 | Annunziata et al. | 324/539 |
| 4,748,652 A | * | 5/1988 | Nagai et al. | 379/27.03 |
| 5,247,242 A | * | 9/1993 | Yamaguchi et al. | 323/324 |
| 2004/0120508 A1 | * | 6/2004 | Sajadi et al. | 379/399.01 |

* cited by examiner

*Primary Examiner* — Simon Sing
*Assistant Examiner* — Akelaw A Teshale
(74) *Attorney, Agent, or Firm* — Young & Thompson (57) ABSTRACT

A telephony distribution system includes a plurality of terminals with two connection points (16A), each for one pair of conductors (17A) forming part of a telephony distribution installation, and, for each of those terminals (16A), a short-circuit manager (25) including a substitution current source (26), a switch (27) and control means (28-31) for causing the switch (27) normally to assume a position in which its output terminal (34) is connected to an input terminal (32) itself connected to a pair of conductors (13, 15) providing a telephone line and to cause the switch (27). In the event of a short-circuit between the two connection points of the terminal (16A) concerned, to assume a second position in which that terminal is connected to the auxiliary current source (26).

16 Claims, 4 Drawing Sheets

TELEPHONY DISTRIBUTION SYSTEM

The invention relates to the distribution of telephony.

It is known that it is beneficial to be able to distribute telephony over a twisted pair of conductors available in a cable also used to distribute local area network signals.

The invention aims in particular to increase the reliability of this kind of distribution.

To this end it proposes a telephony distribution system comprising at least one first terminal with two connection points for a pair of conductors providing a telephone line and a plurality of second terminals with two connection points for a pair of conductors forming part of a telephony distribution installation, with each connection point of each of said second terminals connected or connectable to a respective connection point of said first terminal, which system is characterized in that it comprises, for each of said second terminals, a short-circuit manager including:

a substitution current source;

a switch having a first input terminal connected or connectable to said first terminal, a second input terminal connected to said substitution current source, and an output terminal connected to this second terminal without being connected to another second terminal, said switch assuming a first position in which it connects the output terminal to the first input terminal and isolates the output terminal and the second input terminal from each other and a second position in which it connects the output terminal and the second input terminal to each other and isolates the output terminal and the first input terminal from each other; and control means for controlling said switch to cause it normally to assume said first position and to cause it to assume said second position in the event of a short-circuit between the two connection points of this second terminal.

For example, the connection points of one of the second terminals may be short-circuited by an equipment of the local area network, certain of which utilize the contact pairs 1-2 and 3-6 of conventional RJ 45 connectors and short-circuit the contact pair 4-5 generally used for telephony.

Because the output terminal of each switch is not connected to any second terminal other than the second terminal concerned and because, in the second position of the switch, the output terminal is isolated from the first input terminal, the short-circuit will not propagate either to the first terminal or to the other second terminals, which will therefore remain operational.

It is seen that the system of the invention prevents a local short-circuit from becoming a general short-circuit.

Because, in the second position of the switch, the connection points of the second terminal concerned are connected to the auxiliary current source, the control means, despite being isolated from the pair of conductors providing a telephone line, have an electrical power supply enabling them to tell if the short-circuit between the two connection points of the second terminal concerned is still present or not.

Monitoring the short-circuit and returning the switch to the first position when the short-circuit has disappeared therefore do not necessitate the periodic testing of reconnection to the conductors providing the telephone line.

Accordingly, the system of the invention does not introduce periodic disturbances into the telephone network and offers a particularly short reaction time when the short-circuit disappears.

In a preferred embodiment, said control means are adapted to detect if a first predetermined current and/or voltage condition representative of an absence of a short-circuit between the two connection points of the second terminal concerned is satisfied or not, adapted to detect if a second predetermined current and/or voltage condition representative of a short-circuit between the two connection points of that second terminal is satisfied or not, said second condition being other than the opposite of said first condition, and adapted to cause said switch to assume said first position if said first condition is satisfied, to cause said switch to assume said second position if said second condition is satisfied, and otherwise to cause said switch to remain in said first position or in said second position.

Thus the control means can detect a short-circuit situation and a normal situation in a particularly reliable manner.

According to features of this embodiment, which is a preferred embodiment for reasons of simplicity and convenience, as much of use as of fabrication:

said first condition is the absence of current consumption at the second terminal concerned and said second condition is the combined presence of consumption of current and presence of an undervoltage at the second terminal concerned; and, optionally said control means include an undervoltage detector for determining if the voltage at the second terminal concerned is below a predetermined threshold or not, a unit for detecting consumption of current to determine if the current at the second terminal concerned is above a predetermined threshold or not, a logic unit connected to said undervoltage detector and to said current consumption detector circuit, and a control unit of said switch, said logic unit being adapted to cause said control unit to cause said switch to assume said first position if said current consumption detector does not detect a current consumption higher than said predetermined current threshold at the second terminal concerned, to cause said switch to assume said second position if said undervoltage detector determines that the voltage at the second terminal concerned is below said predetermined threshold and that said current consumption detector determines at the same time that the current consumption at said second terminal concerned is above said predetermined current threshold and to cause said switch to remain in said first position or in said second position if said undervoltage detector determines that the voltage at said second terminal concerned is above said predetermined voltage threshold and that said current consumption detector determines that the current at said second terminal concerned is above said predetermined current threshold; and, optionally said predetermined current threshold is from 0.1 to 1.5 mA; and/or said predetermined voltage threshold is from 2 to 10 V.

According to features of the present invention that are preferred for reasons of simplicity and convenience, as much of use as of fabrication:

said control means include an undervoltage detector including a comparator for determining if the voltage at said second terminal concerned is below a predetermined voltage threshold or not; and, optionally said undervoltage detector includes a full-wave rectifier diode bridge whose input connection points are connected to input connection points of said undervoltage detector; and/or said control means include an undervoltage detector whose input connection points are connected in parallel with said first input terminal of said switch; and/or said control means include a current consumption detector including an optocoupler for detecting if the current at said second terminal concerned is above a predetermined threshold or not; and, optionally said optocoupler is provided with a set of two photodiodes disposed in antiparallel; and/or said control means include a current consumption detector two input connection points of which are disposed in series between one of the connection points of said output terminal of the switch and one of the connection points of the second terminal concerned; and/or said control means include a logic unit including a bistable; and/or said control means include a control unit including a solenoid and a direct current source having a ground pole and a positive pole with each connection point of said solenoid connected to each pole of said direct current source via a transistor whereof a control electrode is connected to a connection point of said control unit via a bias resistor or via a logic signal inverter and via a bias resistor, so that when said connection point is at the same potential as said ground pole, a first of said transistors, disposed between said positive pole and a first connection point of said solenoid, is turned on whereas a second of said transistors, disposed between a second of said connection points of the solenoid and said ground pole, is turned on and the other two transistors are turned off, and so that when said connection point of the control unit is at the same potential as said positive pole, a third of said transistors, situated between said positive pole and said second connection point of said solenoid, is turned on and the fourth transistor, disposed between the first connection point of said solenoid and said ground pole, is turned on and the first transistor and the second transistor are turned off; and/or said auxiliary current source has two power supply poles and a current limiter resistor disposed between one of said power supply poles and one of the connection points of said second input terminal; and/or said system includes two of said first terminals and, for each of said second terminals, a switch having a first input terminal connected to one of said first terminals, a second input terminal connected to the other of said first terminals and an output terminal connected to said second terminal concerned via said short-circuit manager, wherein said switch assumes a first position in which it connects the output terminal to the first input terminal and it isolates the output terminal and the second input terminal from each other and assumes a second position in which it connects the output terminal and the second input terminal to each other and it isolates the output terminal and the first input terminal from each other.

It will be noted that the system of the invention is particularly beneficial in the above configuration (hybrid local area network and telephony distribution installation), but that its use is equally beneficial if the pairs of conductors used to convey telephony form part of an independent installation.

The explanation of the invention continues next with the following description of one embodiment of the invention, which is given by way of illustrative and nonlimiting example and with reference to the appended drawings. In the latter.

Figure 1:
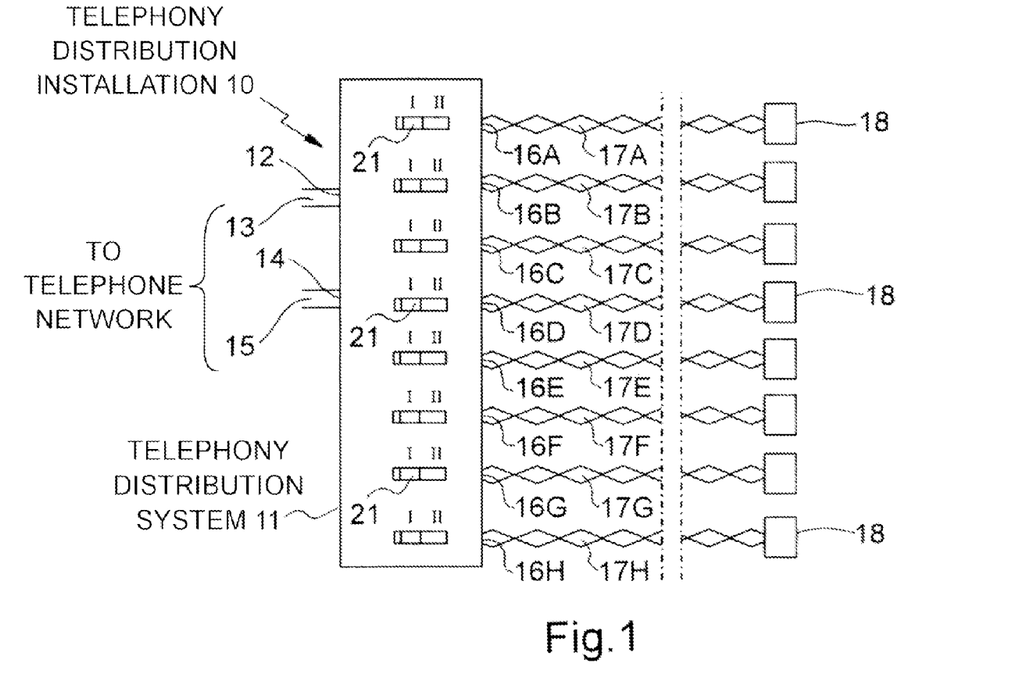
FIG. 1 is a diagram of a telephony distribution installation including a system of the invention.

The installation 10 shown diagrammatically in FIG. 1 includes a system 11 provided with a terminal 12 at which terminates a pair 13 of conductors of a telephone cable, a terminal 14 at which terminates another pair 15 of conductors of a telephone cable, and with eight terminals 16A to 16H at each of which terminates a respective one of eight pairs 17A to 17H of twisted conductors, each of which is connected at the end opposite the system 11 to a connector 18.

Of course, each of the terminals 12, 14 and 16A to 16H has two connection points, one for each respective conductor of the pair terminating at it.

Here the system 11 is disposed in a plant room of the residential or tertiary building to which the installation 10 belongs.

The telephone pairs 13 and 15 are connected to the public switched telephone network which provides a line on each of the pairs 13 and 15, to be more precise to an exchange of the telephony carrier.

The pairs 17A to 17H of twisted conductors here each form part of a conventional local area network cable. Each of these cables includes, in addition to one of the pairs 17A to 17H, three other pairs of twisted conductors carrying signals of a different nature.

Each of the connectors 18 is here of the RJ 45 category 6 type.

Figure 2:
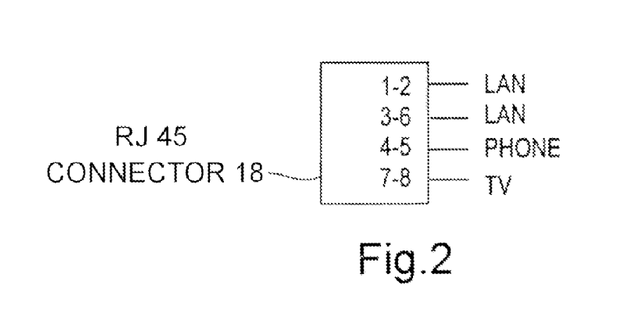
FIG. 2 is a diagram indicating the nature of the signals present on each of four pairs of contacts of connectors of this installation.

FIG. 2 shows the wiring of the connectors 18. The pair of contacts 1 and 2 as well as the pair of contacts 3 and 6 are for the local area network (LAN) signals, the pair of contacts 4 and 5 is for the telephony (PHONE) signals carried by one of the pairs 17A to 17H, and the pair of contacts 7 and 8 is for television (TV) signals.

The circuit between the terminals 12, 14 and 16A is described next with reference to FIG. 3, on the understanding that the following description of the terminal 16A is equally valid for each of the terminals 16B to 16H.

The system 11 includes, for the terminal 16A, a switch 19 and a control unit 20 of the switch 19.

The control unit 20 includes a cursor 21 with two positions marked I and II.

The switch 19 has an input terminal 22 connected to the terminal 12, an input terminal 23 connected to the terminal 14 and an output terminal 24 connected to the terminal 16A via a short-circuit manager 25.

Of course, each of the terminals 22, 23 and 24 has two connection points and between each pair of terminals connected to each other there are two connections each going from one of the connection points of one terminal to a corresponding connection point of the other terminal of the pair.

Figure 3:
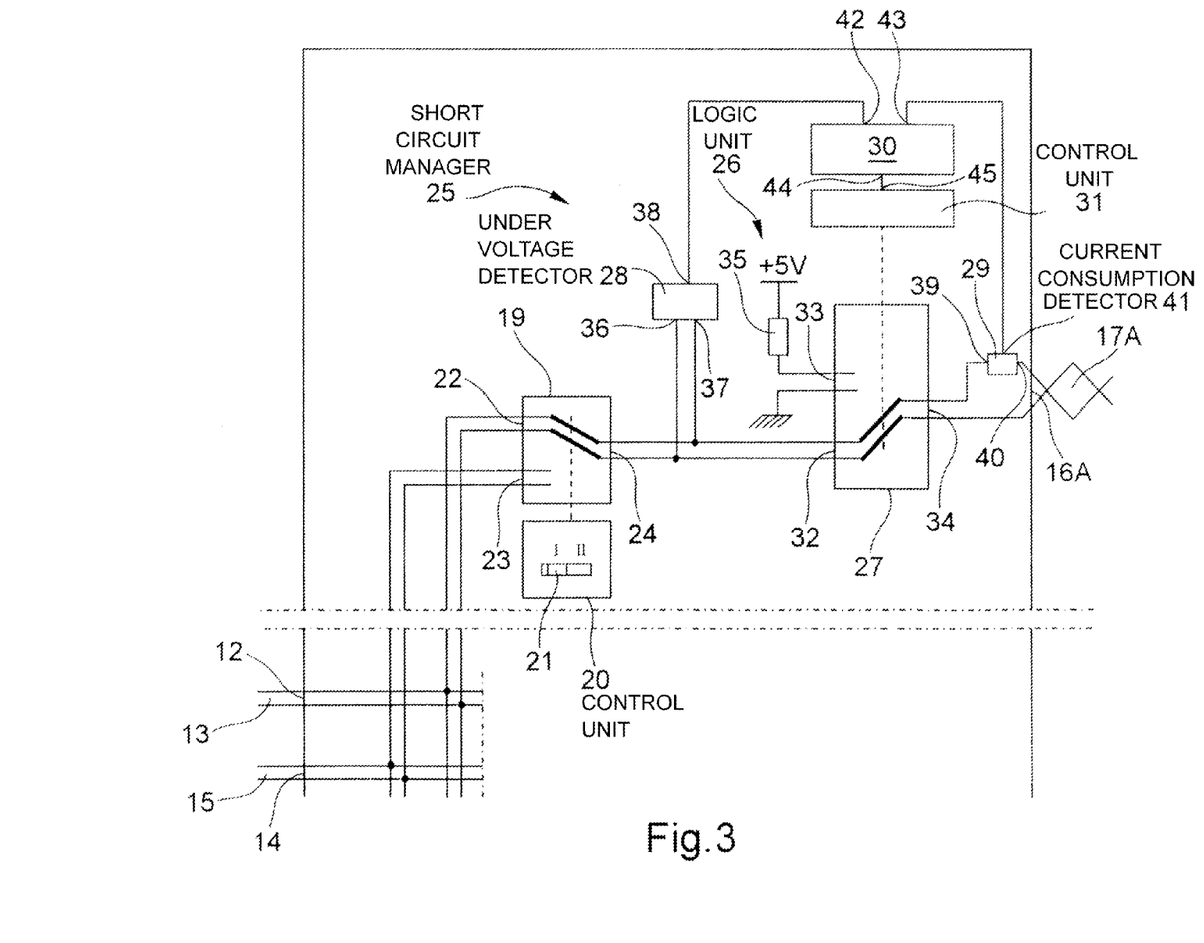
FIG. 3 is a partial diagram of the distribution system of the invention.

When the cursor 21 is in the position I, as shown in FIG. 3, the terminal 24 of the switch 19 is isolated from the terminal 23 and connected to the terminal 22, and therefore to the terminal 12.

When the cursor 21 is in the position II, the terminal 24 is connected to the terminal 23 and therefore to the terminal 14, and isolated from the terminal 22.

Thanks to the switch 19 and its control unit 20, the system 11 can selectively connect the terminal 16A to the terminal 12 or to the terminal 14, i.e. the system can selectively connect the twisted pair 17A to the telephone pair 13 or to the telephone pair 15.

The short-circuit manager 25 includes an auxiliary current source 26, a switch 27 and control means for the switch 27 taking the form of an undervoltage detector 28, a current consumption detector 29, a logic unit 30 and a control unit 31.

The switch 27 has two input terminals 32 and 33 and an output terminal 34.

Of course, each of the terminals 32, 33 and 34 has two connection points and between each pair of terminals connected to each other there are two connections each going from one of the connection points of one terminal to a corresponding connection point of the other terminal of the pair.

The terminal 32 is connected directly by a pair of conductors to the output terminal 24 of the switch 19.

The terminal 33 is connected directly by a pair of conductors to the auxiliary current source 26, which includes a current limiter resistor 35.

Here, the auxiliary current source 26 has a ground pole (reference potential) connected directly to one of the connection points of the terminal 33 and a positive pole, here at a potential of +5 V relative to the reference potential, connected to the other connection point of the terminal 33 via the resistor 35.

When the switch 27 is in the position shown in FIG. 3, which is the normal operation position, the terminals 32 and 34 are connected to each other and the terminals 33 and 34 are isolated from each other, so that the terminal 16A is connected to the terminal 24 and is isolated from the auxiliary current source 26.

In the other position of the switch 27, the terminals 32 and 34 are isolated from each other and the terminals 33 and 34 are connected to each other, so that the terminal 16A is isolated from the terminal 24 and is connected to the auxiliary current source 26.

The undervoltage detector 28 has three connection points 36, 37 and 38.

The connection points 36 and 37 of the detector 28 are connected in parallel with the terminals 32 and 24.

To be more precise, the connection points 36 and 37 are each connected to a respective connection point of the terminal 32 of the switch 27 and, because of the direct connection between the terminals 24 and 32, to a respective connection point of the terminal 24 of the switch 19.

The connection points 36 and 37 enable the detector 28 to determine the voltage present between the connection points of the terminal 24, which is the voltage supplied either by the line 13 or by the line 15. In the normal situation (with the switch 27 in the position shown in FIG. 3), that voltage is also the voltage between the connection points of the terminal 16A.

The connection point 38 supplies a two-state logic signal, one of which it assumes when the potential difference between the connetion points 36 and 37 is below a predetermined threshold, here of 3 V, and the other of which it assumes when the voltage between the connection points 36 and 37 is above that threshold.

The current consumption detector 29 has three connection points 39, 40 and 41.

The connection points 39 and 40 of the detector 29 are connected in series with one of the connections between the terminals 34 and 16A, the connection point 39 being connected to one of the connection points of the terminal 34 and the connection point 40 to one of the connection points of the terminal 16A.

The connection point 41 supplies a two-state logic signal, one of which it assumes when the current flowing between the connection points 39 and 40 is below a predetermined threshold, here of 1 mA, and the other of which it assumes when the current flowing between the connection points 39 and 40 is above that threshold.

The logic unit 30 has three connection points 42, 42 and 44.

The connection points 42 and 43 are connected to the connection point 38 and to the connection point 41, respectively, so that the logic unit 30 receives via the connection points 42 and 43 the logic signals sent by the units 28 and 29.

The connection point 44 supplies a two-state logic signal, whereof one state corresponds to the position of the switch 27 shown in FIG. 3 (normal situation) and the other state corresponds to the position of the switch 27 other than that shown in FIG. 3 (short-circuit situation)

The internal circuit of the logic unit 30 is such that:
when the signal sent by the unit 29 is in the state that it assumes when the current flowing between the connection points 39 and 40 is below the predetermined current threshold (no current consumption), the signal at the connection point 44 is in the state corresponding to the position of the switch 27 shown in FIG. 3 (normal situation) regardless of the state of the signal sent by the detector 28; and when the signal sent by the detector 29 is in the state that it assumes when the predetermined current threshold is exceeded (presence of current consumption) the signal at the connection point 44 assumes the state corresponding to the position of the switch 27 other than that shown in FIG. 3 (short-circuit situation) if the logic signal sent by the detector 28 is in the state that it assumes when the voltage is below the predetermined threshold (undervoltage present), and, if not (no undervoltage), the signal at the connection point 44 remains in the current state (normal situation or short-circuit situation).

The control unit 31 has a connection point 45 connected directly to the connection point 44 of the logic unit 30. It causes the switch 27 to assume the position shown in FIG. 3 or its other position as a function of the state of the signal at the connection point 44 of the logic unit 30.

In the configuration shown in FIG. 3, if there is no external connection between the two connection points of the terminal 16A (there is no equipment connected to the connector 18 or the equipment connected is switched off), the logic signal sent by the detector 28 is in the state corresponding to no undervoltage and the logic signal sent by the detector 29 is in the state corresponding to no current consumption, so that the logic signal sent by the logic unit 30 corresponds to a normal situation. The switch 27 then connects the terminals 32 and 34 and isolates the terminals 33 and 34.

If, starting from this situation, there exists an external consumption of current with no short-circuit, the logic signal sent by the detector 29 changes state but the logic signal sent by the detector 28 does not change state, and the logic signal sent by the logic unit 30 therefore does not change state.

On the other hand, it a short-circuit occurs between the connection points of the terminal 16A, the logic signal sent by the detector 28 and the logic signal sent by the detector 29 both assume the state corresponding to the presence of the monitored criterion, and the logic signal sent by the unit 30 therefore changes state and the control unit 31 causes the switch 27 to assume its position other than that shown in FIG. 3.

In that other position, the terminal 16A is connected to the auxiliary current source 26 without being connected to either the telephone line 13 or the telephone line 15.

Because of the change of position of the switch 27, the signal sent by the detector 28 reverts to the state corresponding to no undervoltage whereas the signal sent by the detector 29 remains in the state corresponding to the presence of consumption of current, so that the signal sent by the logic unit 30 remains in the state corresponding to a short-circuit situation.

When the short-circuit between the connection points of the terminal 16A is removed, the current flowing between the connection points 39 and 40 of the detector 29 is cancelled out, or in any event falls below the predetermined threshold, so that the signal sent by the detector 29 changes state and the logic signal sent by the logic unit 30 consequently changes state, i.e. goes to the state corresponding to a normal situation, so that the control unit 31 causes the switch 27 to assume the position shown in FIG. 3.

The short-circuit between the connection points of the terminal 16A may be produced by a local area network equipment, for example, some of which use the pairs of contacts 1-2 and 3-6 in the RJ 45 connector and short-circuit the pair of contacts 4-5.

If there is a short-circuit between the connection points of the terminal 16A, the effect of the switch 27 going to its position other than that shown in FIG. 3 is that the short-circuit is not propagated downstream of the switch 19.

To be more precise, if the cursor 21 is in the position I, the short-circuit does not propagate back to the terminal 12 or to any of the other terminals connected to a twisted pair for which the cursor 21 is in the position I. Of course, if the cursor 21 is in the position II, the short-circuit does not propagate back to the terminal 14 or to the other terminals connected to a twisted pair for which the cursor 21 is in the position II.

In the position of the switch 27 other than that shown in FIG. 3, the auxiliary current source 26 provides an electrical power supply to the means that control that unit, here the detector 29, despite the isolation from the pair of conductors 13 or 15 providing a telephone line, so that it can tell if the short-circuit between the connection points of the terminal 16A is still present or not.

Given the potential difference between the poles of the source 26 (which is only 5 V DC, whereas the nominal potential difference on a telephone line is of 48 V DC), and given the presence of the current limiter resistor 35, the abovementioned threshold of 1 mA is not achieved with a conventional telephone equipment in a current consumption configuration, for example a telephone that is off-hook, especially as the twisted pair of conductors 17A increases in length, the resistance of that pair being added to the value of the current limiter resistor 35.

Detecting the occurrence of a short-circuit and the return of the switch 27 to its initial position (shown in FIG. 3) when the short-circuit has disappeared does not necessitate periodically testing for a change to the position shown in FIG. 3, the short-circuit manager 25 thus offering the advantages of avoiding the introduction of periodic disturbances into the telephone network and of offering a particularly short reaction time when the short-circuit disappears.

Detecting a short-circuit followed by a return to a normal situation by means of the two detectors 28 and 29, which monitor different criteria, makes detection much more reliable than if only one criterion were used.

If detecting a short-circuit were based on only one criterion, for example the absence or presence of an overcurrent, it would be extremely difficult, if not impossible, to determine a single discrimination threshold suitable for all circuits encountered in practice, because of very large individual variations, in particular in the voltage actually supplied by the telephone carrier and by the resistance of the conductors of the telephone installation, in this instance of the pair 17A for the terminal 16A. On the other hand, using two separate criteria, here the voltage criterion (detector 28) and a current criterion (detector 29), means that detection can be effected using the same thresholds for a very wide variety of situations encountered in practice, so that it is therefore possible to fix the discrimination thresholds used by the detectors once and for all at the fabrication stage.

Figure 4:
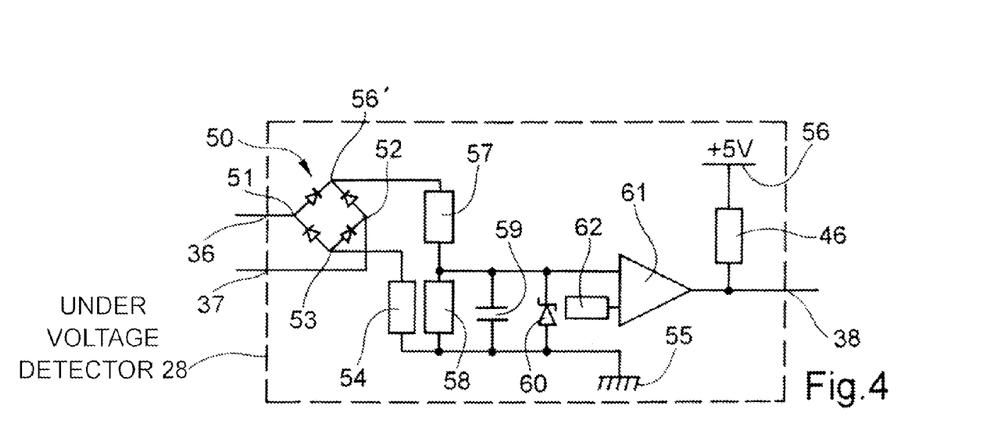
FIGS. 4 to 6 are more detailed representations of units that form the control means included in each short-circuit manager of the system of the invention, namely an undervoltage detector (FIG. 4), a current consumption detector (FIG. 5), and a combination formed by a logic unit and a control unit (FIG. 6).
Figure 5:
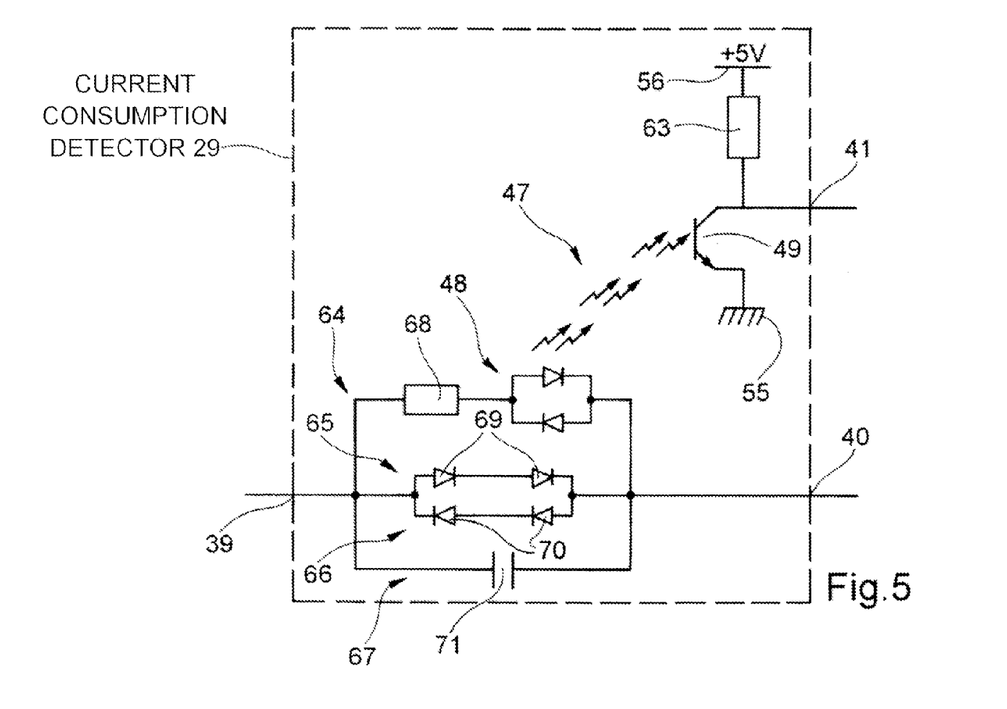
Figure 6:
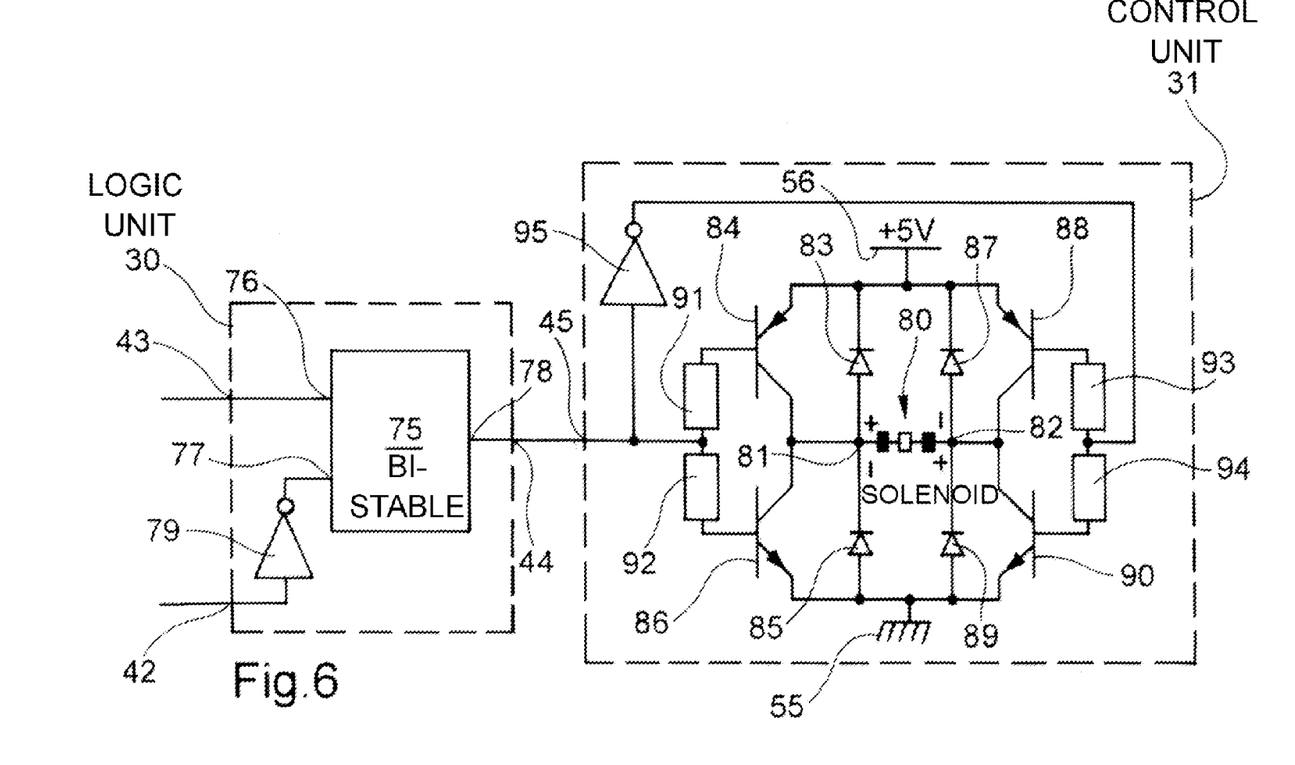

The units 28 to 31 that form the control means for the switch 27 are described in more detail next with reference to FIGS. 4 to 6.

The units 28 and 29 are adapted to operate regardless of the polarity present on the pair of conductors 13 or 15, i.e. the potential at the connection point 36 can be either higher or lower than the potential at the connection point 37, and the current may also flow from the connection point 39 to the connection point 40 or vice-versa.

The undervoltage detector 28 includes a set 50 of four diodes connected as a full-wave rectifier bridge whose input connection points-51- and 52 are connected to the connection point 36 and to the connection point 37, respectively.

The connection point 53 of the set 50 corresponding to the negative pole is connected to one of the connection points of a current limiter resistor 54 whose other connection point is connected to the ground pole 55 of a direct current source to which the detector 28 is connected.

The positive pole 56' of the rectifier system 50 is connected to one of the connection points of a resistor 57. The other connection point of the resistor 57 is connected to one of the connection points of a resistor 58 whose other connection point is connected to the ground pole 55.

The connection points of the resistors 57 and 58 that are connected to each other are also connected to a connection point of a capacitor 59, to a connection point of a Zener diode 60, and to an input connection point of a comparator 61. The other connection point of the capacitor 59 and the other connection point of the diode 60 are each connected to the ground pole 55.

The other input connection point of the comparator 61 is connected to a voltage reference 62.

The output connection point of the comparator 61 is connected to the positive pole 56 of the direct current source of which the ground pole 55 forms part, via a coupling resistor 46, the output connection point of the comparator 61 being also connected to the connection point 38 of the detector 28.

The resistors 57 and 58 constitute a divider bridge for reducing the voltage applied to the input of the comparator 61, the capacitor 59 smoothes that voltage, if necessary, the Zener diode 60 peak-limits the latter voltage, and, in conjunction with the resistors 57 and 58, the resistor 54 limits the current flowing between the connection points 36 and 37.

The reference voltage 62 and the values chosen for the resistors 54, 57 and 58, the capacitor 59 and the Zener diode 60 set the threshold at which the comparator 61 changes from a state in which its output connection point is at the potential of the pole 55 to a state in which its output connection point is at the potential of the pole 56.

As indicated hereinabove, that threshold corresponds here to a voltage of 3 V between the connection points 36 and 37.

Below this threshold, the connection point 38 is at the same potential as the pole 55 (logic 0).

When the voltage between the connection points 36 and 37 is above the predetermined threshold, the connection point 38 is at the same potential as the ground pole 56 (logic 1).

Accordingly, when the connection point 38 is at logic 0, the detector 28 is detecting the presence of an undervoltage, whereas when it is at logic 1, the detector 28 is detecting the absence of any undervoltage.

The current consumption detector 29 includes an optocoupler 47 including a set 48 of two photodiodes disposed in anti-parallel and a phototransistor 49 whereof the emitter is connected to the ground pole 55 of the same direct current source as the detector 28; the collector of this phototransistor is connected to the positive pole 56 of that source via a coupling resistor 63.

Accordingly, if a current having a value above the threshold for triggering one or the other of the diodes 48 flows between the connection points 39 and 40, the phototransistor 49 is turned on and the connection point 41 is at the same potential as the pole 55, whereas for a current below that threshold the phototransistor 49 is turned off, with the result that the connection point 41 is at the same potential as the pole 56.

Accordingly, when the connection point 41 is at the same potential as the pole 55 (logic 0), this corresponds to detection of consumption of current by the detector 29 and when the connection point 41 is at the same potential as the pole 56 (logic 1), this corresponds to no detection of consumption of current by the detector 29.

The detector 29 includes a circuit with four branches 64, 65, 66 and 67 connected in parallel between the connection points 39 and 40.

The set 48 of two photodiodes forms part of the branch 64, which also includes a current limiter resistor 68 in series with the set 48.

The branch 65 includes two diodes 69 in series connected in the direction in which they allow current to pass from the connection point 39 to the connection point 40 but block current in the opposite direction.

The branch 66 includes two diodes 70 identical to the diodes 69 in series and connected in the direction in which they allow current to flow from the connection point 40 to the connection point 39 and block current in the opposite direction.

According to the direction in which the current is flowing, one of the two branches 65 and 66 introduces a small voltage drop between the connection points 39 and 40, enabling activation of one of the two photodiodes of the set 48.

The voltage drop created by the diode 69 or 70, the value of the resistor 68 and the characteristics of the photodiodes of the set 48 are such that a current of 1 mA between the connection points 39 and 40 is sufficient to activate one of the photodiodes of the set 48.

Finally, the branch 67 includes a capacitor 71 whose capacitance is such that it allows direct passage of ADSL signals (frequency range from 25.8 to 1104 kHz) between the connection points 39 and 40.

The logic unit 30 includes a bistable 75 having two input connection points 76 and 77 and an output connection point 78.

The bistable 75 is such that:
when logic 1 (the potential of the positive pole 56) is present at each of the connection points 76 and 77, the connection point 78 is at logic 1;
when logic 1 is present at the connection-point 76 and logic 0 (the potential of the ground pole 55) is present at the connection point 77, the connection point 78 is at logic 1;
when logic 0 is present at the connection point 76 and logic 1 is present at the connection point 77, the connection point 78 is at logic 0; and
when logic 0 is present at each of the connection points 76 and 77 the connection point 78 remains at logic 0 or logic 1 (it does not change state).

The input connection point 76 is connected directly to the connection point 43.

The input connection point 77 is connected to the connection point 42 via a logic signal inverter 79.

Accordingly, the signal, present at the connection point 44 of the logic unit 30:
is at logic 1 when the signal present at the connection point 43 is at logic 1 (the detector 29 detects no consumption of current), regardless of the signal present at the connection point 42;
is at logic 0 if the signal present at the connection point 43 is at logic 0 (the detector 29 detects current consumption) and the signal present at the connection point 42 is at logic 0 (the detector 28 detects an undervoltage); and
remains at logic 0 or logic 1 (no change of state) if the logic signal at each of the connection points 43 and 42 is at logic 0 (current consumption present and undervoltage absent).

When the logic signal present at the connection point 44 (and therefore at the connection point 45) is at logic 1, the switch 27 is in the position shown in FIG. 3, and vice-versa.

The control unit 31 of the switch 27 includes a solenoid 80 disposed between two connection points 81 and 82 such that the connection point 81 is connected to the pole 56 and the connection point 82 to the pole 55 when the logic signal present at the connection point 45 is at logic 0 and vice versa if the logic signal is at logic 1. Between the connection point 81 and the pole 56 there are disposed in parallel a protection diode 83 oriented in the direction in which it allows current to flow from the connection point 81 to the pole 56 but blocks the current in the opposite direction and a PNP transistor 84 whose emitter is connected to the pole 56 and whose collector is connected to the connection point 81.

Between the connection point 81 and the pole 55 are disposed in parallel a protection diode 85 oriented in the direction in which it allows current to flow from the pole 55 to the connection point 81 but blocks current in the opposite direction and an NPN transistor 86 whose collector is connected to the connection point 81 and the emitter to the pole 55.

Between the connection point 82 and the pole 56 are disposed in parallel a protection diode 87 oriented in the direction in which it allows current to flow from the connection point 82 to the pole 56 but blocks current in the opposite direction and a PNP transistor 88 whose collector is connected to the connection point 82 and whose emitter is connected to the pole 56.

Between the connection point 82 and the pole 55 are disposed in parallel a protection diode 89 oriented in the direction in which it allows current to flow from the pole 55 to the connection point 82 but blocks current in the opposite direction and an NPN transistor 90 whose collector is connected to the connection point 82 and whose emitter is connected to the pole 55.

A bias resistor 91 is disposed between the connection point 45 and the base of the transistor 84.

A bias resistor 92 is disposed between the connection point 45 and the base of the transistor 86.

A bias resistor 93 has one of its connection points connected to the base of the transistor 88 and a bias resistor 94 has one of its connection points connected to the base of the transistor 90, the resistors 93 and 94 being connected together at their remaining connection point, which are also connected to the connection point 45 via a logic signal inverter 95.

When the logic signal present at the connection point 45 is at logic 0 (the potential at the pole 55), the transistors 84 and 90 are turned on and the transistors 86 and 88 are turned off, whereas when that logic signal is at logic 1 (the potential at the pole 56), the transistors 86 and 88 are turned on and the transistors 84 and 90 are turned off.

Accordingly, as indicated hereinabove, when it is at logic 0 the connection point 81 is at the potential at the pole 56 and the connection point 82 is at the potential at the pole 55 and the solenoid 80 causes the switch 27 to assume its position other than that shown in FIG. 3, and vice versa when it is at logic 1.

It goes without saying that the system 11, although it constitutes a functional whole, does not necessarily constitute a single hardware unit.

At present, in a preferred embodiment, the switches 19, their control units 20 and the short-circuit managers 25 are combined in an active electronic unit and the terminals 12, 14 and 16A to 16H are part of a wiring concentrator provided with a connector to receive this active electronic unit.

In variants that are not shown, the telephone pairs 13 and 15 are connected to a private telephone network rather than a public telephone network and/or to a digital telephone network rather than a switched telephone network, the telephony distribution system is replaced by a system connected to a single telephone pair, in which case the managers 25 are each connected directly to that pair (there is no switch 19 and each input terminal like the terminal 32 is connected directly to the single terminal like the terminal 12 or 14), and/or a plurality of terminals is provided for a telephone pair such as the twisted pairs 17A to 17H, but less than or greater than eight in number.

In other variants that are not shown, the auxiliary current source has different characteristics, for example the potential difference is less than 5 V or higher; the connection points 36 and 37 of the undervoltage detector 28' are downstream of the switch 27 rather than upstream thereof; the discrimination thresholds set for the indervoltage detector 28 and for the current consumption detector 29 are different, for example from 2 to 10 V and from 0.1 to 1.5 mA; the principal components employed by the detectors are other than a comparator like the comparator 61 and an optocoupler like the optocoupler 47, for example, for the undervoltage detector, a Hall-effect sensor for detecting the magnetic field depending on the voltage that exists between the two conductors of the pair providing a telephone line; and/or the constitutions of the logic unit such as the logic unit 30 and the control unit such as the unit 31 are different, for example they use components other than TTL components.

In further variants that are not shown, the switch 27 assumes the position shown in FIG. 3 when a first condition is satisfied, assumes its position other than that shown in FIG. 3 if a second condition is satisfied, and otherwise remains in its current position, with a second condition that is other than the opposite of the first condition, but the first condition is other than the absence of current consumption, and/or the second condition is other than the combined presence of current consumption and presence of an undervoltage. For example, the first condition is the combined absence of current consumption and absence of undervoltage whereas the second condition is the combined presence of current consumption and presence of an undervoltage.

In still further variants that are not shown, there is only one condition for the switches such as the switch 27, which assumes the position shown in FIG. 3 when that condition is satisfied and its other position when that condition is not satisfied, that condition being the absence of overcurrent in the telephone line, for example; or more than two conditions are used, for example a current condition, a voltage condition and a dynamic current variation condition, for example the presence of a relatively steep rising current edge.

Many other variants are feasible as a function of particular circumstances, and in this regard it must be remembered that the invention is not limited to the examples described and shown.

The invention claimed is:

1. A telephony distribution system comprising:
   at least one first connector terminal with two connection points for a pair of conductors providing a telephone line and a plurality of second connector terminals with two connection points for a pair of conductors forming part of a telephony distribution installation, with each connection point of each of said second connector terminals connected or connectable to a respective connection point of said first connector terminal, which system comprises, for each of said second connector terminals, a short circuit manager including:
   a substitution current source;
   a switch having a first input terminal connected or connectable to said first connector terminal, a second input terminal connected to said substitution current source, and an output terminal connected to said each of said second connector terminals, without being connected to another second connector terminal, said switch having a first position in which said switch connects the output terminal to the first input terminal and isolates the output terminal and the second input terminal from each other and a second position in which said switch connects the output terminal and the second input terminal to each other and isolates the output terminal and the first input terminal from each other; and
   control means for controlling said switch to normally set said switch to said first position and to set said switch to said second position in the event of a short-circuit between the two connection points of said each of said second connector terminals.

2. The telephony distribution system according to claim 1, wherein said control means are adapted to detect upon a first predetermined current and/or voltage condition representative of an absence of a short-circuit between the two connection points of the second connector terminal concerned being satisfied or not, adapted to detect upon a second predetermined current and/or voltage condition representative of a short-circuit between the two connection points of that second connector terminal being satisfied or not, said second condition being other than the opposite of said first condition, and adapted to set said switch to said first position upon said first condition being satisfied, setting said switch to said second position upon said second condition being satisfied, and otherwise setting said switch to remain in said first position or in said second position.

3. The telephony distribution system according to claim 2, wherein said first condition is the absence of current consumption at the second connector terminal concerned and said second condition is the combined presence of consumption of current and presence of an under voltage at the second connector terminal concerned.

4. The telephony distribution system according to claim 3, wherein said control means include an under voltage detector for determining upon the voltage at the second connector terminal concerned being below a predetermined threshold or not, a unit for detecting consumption of current to determine upon the current at the second connector terminal concerned being above a predetermined threshold or not, a logic unit connected to said under voltage detector and to said current consumption detector circuit, and a control unit of said switch, said logic unit being adapted to cause said control unit to set said switch to said first position upon said current consumption detector does not detect a current consumption higher than said predetermined current threshold at the second connector terminal concerned, to set said switch to said second position upon said under voltage detector determines that the voltage at the second connector terminal concerned being below said predetermined threshold and that said current consumption detector determines at the same time that the current consumption at said second connector terminal concerned is above said predetermined current threshold and to set said switch to remain in said first position or in said second position upon said under voltage detector determines that the voltage at said second connector terminal concerned being above said predetermined voltage threshold and that the current consumption detector determines that the current at said second connector terminal concerned is above said predetermined current threshold.

5. The telephony distribution system according to claim 4, wherein said predetermined current threshold is from 0.1 to 1.5 mA.

6. The telephony distribution system according to claim 4, wherein said predetermined voltage threshold is from 2 to 10 V.

7. The telephony distribution system according to claim 1, wherein said control means include an under voltage detector including a comparator for determining upon the voltage at said second connector terminal concerned is below a predetermined voltage threshold or not.

8. The telephony distribution system according to claim 7, wherein said under voltage detector includes a full-wave rectifier diode bridge whose input connection points are connected to input connection points of said under voltage detector.

9. The telephony distribution system according to claim 1, wherein said control means include an under voltage detector whose input connection points are connected in parallel with said first input terminal of said switch.

10. The telephony distribution system according to claim 1, wherein said control means include a current consumption detector including an optocoupler for detecting upon the current at said second connector terminal concerned is above a predetermined threshold or not.

11. The telephony distribution system according to claim 10, Wherein said optocoupler is provided with a set of two photodiodes disposed in antiparallel.

12. The telephony distribution system according to claim 1, wherein said control means include a current consumption detector two input connection points of which are disposed in series between one of the connection points of said output terminal of the switch and one of the connection points of the second connector terminal concerned.

13. The telephony distribution system according to claim 1, wherein said control means include a logic unit including a bistable.

14. The telephony distribution system according to claim 1, wherein said control means include a control unit including a solenoid and a direct current source having a ground pole and a positive pole with each connection point of said solenoid connected to each pole of said direct current source via a transistor whereof a control electrode is connected to a connection point of said control unit via a bias resistor or via a logic signal inverter an via a bias resistor, so that when said connection point is at the same potential as said ground pole, a first of said transistors, disposed between said positive pole and a first connection point of said solenoid, is turned on whereas a second of said transistors, disposed between a second of said connection points of the solenoid and said ground pole, is turned on and the other two transistors are turned off, and so that when said connection point of the control unit is at the same potential as said positive pole, a third of said transistors, situated between said positive pole and said second connection point of said solenoid, is turned on and the fourth transistor, disposed between the first connection pint upon said solenoid and said ground pole, being turned on and the first transistor and the second transistor are turned off.

15. The telephony distribution system according to claim 1, wherein said auxiliary current source has two power supply poles and a current limiter resistor disposed between one of said power supply poles and one of the connection points of said second input terminal.

16. The telephony distribution system according to claim 1, further including two of said first connector terminals and, for each of said second connector terminals, a switch having a first input terminal connected to one of said first connector terminals, a second input terminal connected to the other of said first connector terminals and an output terminal connected to said second connector terminal concerned via said short-circuit manager, wherein said switch set to a first position in which said switch connects the output terminal to the first input terminal and said switch isolates the output terminal and the second input terminal from each other and set to a second position in which said switch connects the output terminal and the second input terminal to each other and said switch isolates the output terminal and the first input terminal from each other.

* * * * *